United States Patent
Tokoi et al.

(10) Patent No.: US 10,530,210 B2
(45) Date of Patent: Jan. 7, 2020

(54) AXIAL AIR GAP ROTATING ELECTRIC MACHINE

(71) Applicant: Hitachi Industrial Equipment Systems Co., Ltd., Chiyoda-ku, Tokyo (JP)

(72) Inventors: Hirooki Tokoi, Tokyo (JP); Shuuichi Takahashi, Tokyo (JP); Yasuei Yoneoka, Tokyo (JP); Toshifumi Suzuki, Tokyo (JP); Toru Sakai, Tokyo (JP); Katsuyuki Yamazaki, Tokyo (JP); Ryousou Masaki, Tokyo (JP); Norihisa Iwasaki, Tokyo (JP); Yuji Enomoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 518 days.

(21) Appl. No.: 15/303,055

(22) PCT Filed: Apr. 11, 2014

(86) PCT No.: PCT/JP2014/060450
§ 371 (c)(1),
(2) Date: Dec. 30, 2016

(87) PCT Pub. No.: WO2015/155879
PCT Pub. Date: Oct. 15, 2015

(65) Prior Publication Data
US 2017/0155297 A1    Jun. 1, 2017

(51) Int. Cl.
*H02K 3/34* (2006.01)
*H02K 21/24* (2006.01)
(Continued)

(52) U.S. Cl.
CPC ............. *H02K 3/34* (2013.01); *H02K 7/088* (2013.01); *H02K 21/24* (2013.01); *H02K 1/182* (2013.01)

(58) Field of Classification Search
CPC .......... H02K 3/34; H02K 1/182; H02K 7/088; H02K 21/24; H02K 3/521; H02K 5/1732;
(Continued)

(56) References Cited

U.S. PATENT DOCUMENTS

2014/0009009 A1*  1/2014  Deguchi ............... H02K 1/182
                                                                310/43

FOREIGN PATENT DOCUMENTS

JP    2000-253635 A    9/2000
JP    2010-115069 A    5/2010
(Continued)

OTHER PUBLICATIONS

International Search Report (PCT/ISA/210) issued in PCT Application No. PCT/JP2014/060450 dated Jul. 22, 2014 with English translation (3 pages).
(Continued)

*Primary Examiner* — Nguyen Tran
*Assistant Examiner* — Monica Mata
(74) *Attorney, Agent, or Firm* — Crowell & Moring LLP

(57) ABSTRACT

To ensure ready assembly of a stator and reliably reduce the shaft voltage in an axial air gap rotating electric machine, an axial air gap rotating electric machine has a circular ring-shaped stator formed by a plurality of stator cores arranged about a rotational axis direction in a ring shape. Each stator core comprises a tubular bobbin and a coil, with the tubular bobbin having an iron core inserted into a bobbin inner tubular portion substantially matching the peripheral shape of the iron core. The axial air gap rotating electric machine has a first conductive member having a horizontal portion and a vertical portion contacting the end surface of the bobbin opening portion. The horizontal portion contacts parts of the iron core outer peripheral surface and the inner peripheral surface of the bobbin inner tubular portion, and the vertical portion is conductively connected to the inner circumferential housing surface.

14 Claims, 13 Drawing Sheets

(51) Int. Cl.
*H02K 7/08* (2006.01)
*H02K 1/18* (2006.01)

(58) Field of Classification Search
CPC .... H02K 11/33; H02K 11/40; H02K 2203/12; H02K 1/2793; H02K 16/00; H02K 16/02
See application file for complete search history.

(56) References Cited

FOREIGN PATENT DOCUMENTS

| | | |
|---|---|---|
| JP | 2012-5307 A | 1/2012 |
| JP | 2013-121226 A | 6/2013 |
| JP | 2014-17915 A | 1/2014 |
| WO | WO 2013/099343 A1 | 7/2013 |

OTHER PUBLICATIONS

European Search Report issued in counterpart European Application No. 14888872.0 dated Feb. 13, 2018 (nine (9) pages).
European Office Action issued in counterpart European Application No. 14888872.0 dated Aug. 7, 2019 (nine (9) pages).

* cited by examiner

AXIAL AIR GAP ROTATING ELECTRIC MACHINE

TECHNICAL FIELD

The present invention relates to an axial air gap rotating electric machine, and more particularly, to a structure of a stator of the axial air gap rotating electric machine

BACKGROUND ART

There are known axial air gap rotating electric machines in which a stator and a rotor plane-face each other with a predetermined air gap interposed therebetween in a radial direction of a rotating shaft. In addition to an advantage that the structure becomes thin (flat), the axial air gap rotating electric machine can increase a structural facing area between the stator and the rotator. Therefore, the axial air gap rotating electric machine has a structure suitable for high power density and high efficiency.

As a stator used for such an axial air gap rotating electric machine, there are known structures disclosed in Patent Literature 1 and Patent Literature 2. Patent Literature 1 and Patent Literature 2 disclose an axial air gap rotating electric machine having a configuration in which a plurality of stator members each in which a coil is wound around an outer peripheral side surface of a laminated iron core having a substantially trapezoidal shaped end side surfaces are arranged about a rotating shaft in a ring shape, and are fixed to an inner circumferential surface of a motor housing.

On the other hand, the axial air gap rotating electric machine has the structure suitable for high power density and high efficiency, but has characteristics that a shaft voltage generated in a bearing is increased as the facing area between the stator and the rotor is relatively large. For example, in a permanent magnet rotating electric machine driven by an inverter, a common mode voltage of the inverter causes an electrostatic coupling to the rotor side to generate the shaft voltage. An excessively large shaft voltage causes electrocorrosion of the bearing, thereby reducing the life of the bearing. In the axial air gap rotating electric machine with the large facing area between the stator and the rotor, there is a tendency of easily increasing an electrostatic capacitance between the coil and the rotor. Particularly, the axial air gap rotating electric machine may have a structure in which stator cores are held in a housing by a resin molding to secure the strength, and the like. Thus, the stator cores become floating potential, the electrostatic capacitance between the coil and the rotor is further increased, and the shaft voltage becomes high.

Patent Literature 3 discloses a technology for reducing the shaft voltage of the axial air gap rotating electric machine. Specifically, a stator core member has a configuration in which an end part of an iron core is slightly protruded from an opening portion of a tubular bobbin into which a columnar iron core is inserted. A plate-like conductive member which is in contact with the inner circumferential surface of the housing from a vertical direction and is conductive is brought into contact with the outer peripheral side surface of the protruded (exposed) portion of the iron core, to reduce the electrostatic capacitance between the coil and the rotor.

CITATION LIST

Patent Literature

PATENT LITERATURE 1: JP-A-2010-115069
PATENT LITERATURE 2: JP-A-2013-121226
PATENT LITERATURE 3: JP-A-2012-5307

SUMMARY OF INVENTION

Technical Problem

Generally, as disclosed in Patent Literatures 1 and 2, in such a structure where an iron core having a column-like shape is inserted to a tubular bobbin, it is preferable that an outer diameter of the iron core and an inner diameter of the bobbin be substantially matched with each other, to stabilize support of the iron core. However, if the stability is pursued, an insertion pressure of the iron core is increased, higher accuracy of an insertion angle is required, and the iron core and the bobbin may be broken. Particularly, as disclosed in Patent Literatures 1 and 2, when the iron core is formed by laminating plate-like magnetic bodies, the plate-like magnetic bodies may be buckled, or the like due to excessive friction when the iron core is inserted into the bobbin.

The neighborhood of an end portion of the iron core is a portion where the friction between it and the bobbin is excessively concentrated. If a configuration disclosed in Patent Literature 3 is applied to solve the shaft voltage problem caused by the electrostatic capacitance between the coil and the rotor, it is also considered that the damage near the end portion of the iron core may cause unreliable contact with the conductive member.

It is desirable to ensure the assemblability of the stator and reliably reduce the shaft voltage.

Solution to Problem

To solve the above problems, the claimed invention is applied. That is, an axial air gap rotating electric machine comprises: a circular ring-shaped stator formed by a plurality of stator cores arranged about a rotational axis direction in a ring shape, the stator cores each comprising an iron core, a tubular bobbin and a coil, the iron core having a columnar body whose side surface has a substantially trapezoidal shape, the tubular bobbin having the iron core inserted into a bobbin inner tubular portion substantially matching the outer peripheral shape of the iron core, the coil being wound around an outer tubular portion of the bobbin; at least one rotor plane-opposing to the side surface with a predetermined air gap interposed therebetween in a radial direction of a rotating shaft; a substantially tubular shaped housing having an inner circumferential surface which supports the stator; and a bracket which rotatably supports the rotating shaft connected with the housing and with the rotor through a bearing. The axial air gap rotating electric machine has a plate-like first conductive member having a horizontal portion extending from one opening portion of the bobbin inner tubular portion on the inner peripheral surface of the bobbin inner tubular portion in parallel with the rotating shaft and a vertical portion bent in a direction perpendicular to the extending direction of the horizontal portion and contacting the end surface of the opening portion, wherein the horizontal portion contacts a part of the outer peripheral surface of the iron core and a part of the inner peripheral surface of the bobbin inner tubular portion, and the vertical portion is conductively connected to the inner circumferential surface of the housing.

Advantageous Effects of Invention

According to an aspect of the present invention, the assemblability of the stator is ensured and the shaft voltage is reliably reduced in the axial air gap rotating electric machine.

The other problems and effects of the present invention will be apparent from the following description.

DESCRIPTION OF EMBODIMENTS

First Embodiment

Figure 1A:
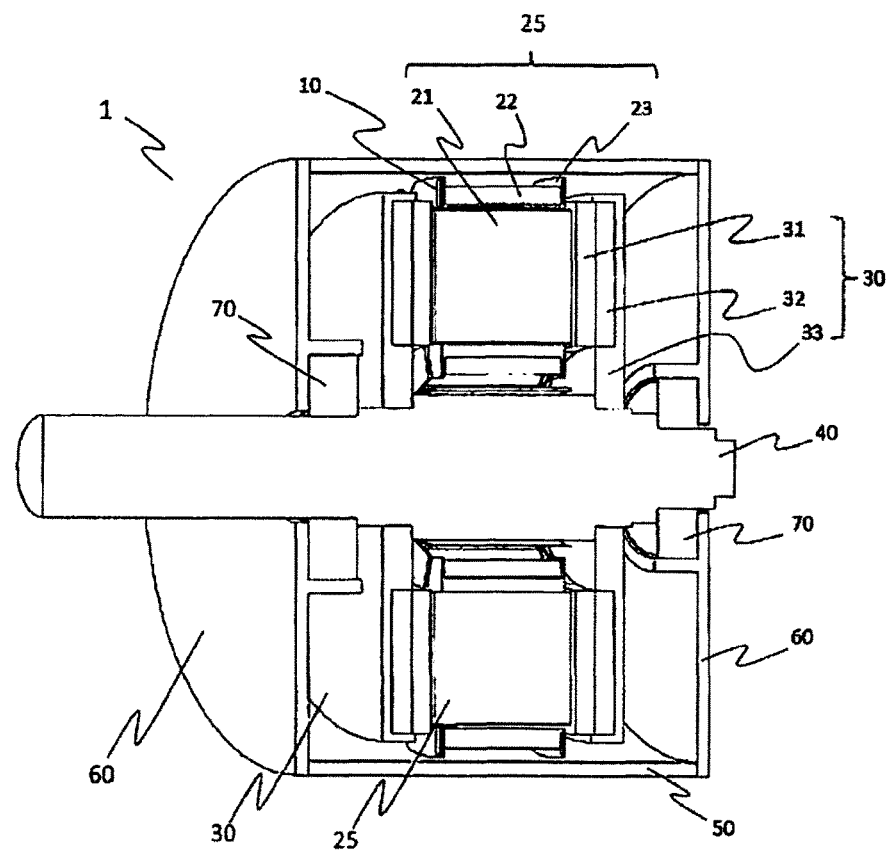
FIG. 1A is a sectional side view illustrating an outline configuration of an axial air gap rotating electric machine according to a first embodiment to which the present invention is applied.
Figure 1B:
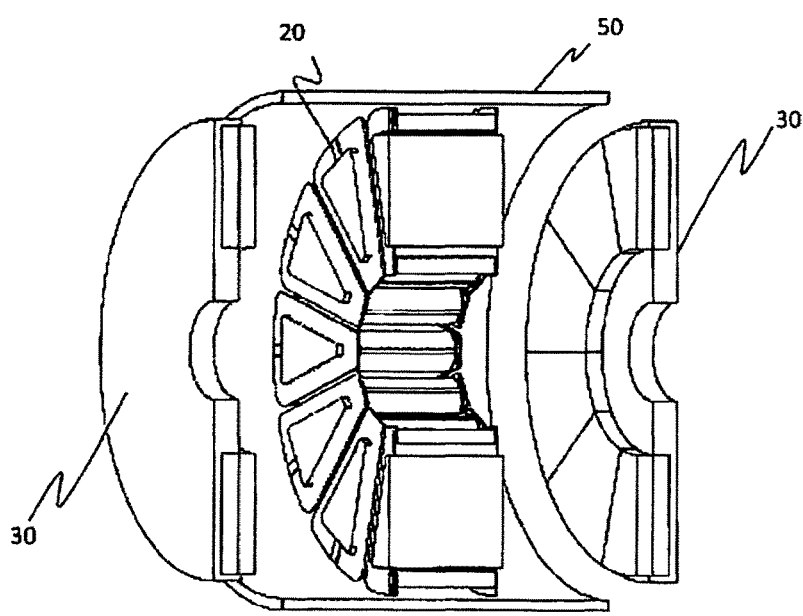
FIG. 1B is a sectional side view illustrating an outline of main parts of the rotating electric machine according to the first embodiment.

A first embodiment for carrying out the present invention is described hereinafter with reference to the drawings. FIG. 1A and FIG. 1B illustrate an outline configuration of a double rotor type axial air gap rotating electric machine 1 (herein after may be simply referred to as a "rotating electric machine 1") according to one embodiment to which the present invention is applied.

FIG. 1A is a perspective cross-sectional view in a rotational axis direction of the rotating electric machine 1. In the rotating electric machine 1, a stator 20 having a ring donut shape is fixed to an inner circumference of a housing 50 having an inner diameter of a substantially cylindrical shape. A rotor 30 includes permanent magnets 31, a back yoke 32, and a yoke 33, and has a disc shape. A plurality of permanent magnets 31 are magnetized in the rotational axis direction, and are arranged in a circumferential direction so that adjacent magnets have opposite magnetic polarities. The permanent magnets 31 are connected to the yoke 33 through the back yoke 32.

The rotors 30 are arranged so that magnetized surfaces thereof sandwich the stator 20 from an output shaft side and an opposite output shaft side, and the magnetized surfaces of the rotors 30 face planes at both ends of the stator 20 in the rotational axis direction with a predetermined air gaps interposed therebetween, respectively. The rotors 30 are connected to a shaft 40 to rotate together with it. An outer side in the rotational axis direction of the shaft 40 is connected to end brackets 60 through bearings 70. The end bracket 60 is fixed to both ends of the housing 50 so as to support the rotator 30 rotatably.

As illustrated in FIG. 1B, in the stator 20, a plurality of stator cores 25 are arranged about the shaft 40 in a ring shape, and the stator cores 25 are integrally resin-molded (not illustrated) with housing 50 to be fixed thereto. Note that the stator cores 25 arranged in a ring shape may be fixed to the housing 50 with bolts or the like after being integrally resin-molded with the housing 50.

The axial air gap rotating electric machine 1 thus configured operates as follows. An AC current flowing in a coil 22 of the stator core 25 through an inverter or the like generates a rotating magnetic field. A torque is generated by attracting and repulsing a DC magnetic field of a rotator 30 formed by the permanent magnetics 31 and the rotating magnetic field of the coil 22 wound around the stator core 25. A common-mode voltage of the inverter causes an electrostatic coupling between the coil 22 and the rotor 30, and a potential difference is generated between inner and outer rings of the bearing 70.

Figure 2A:
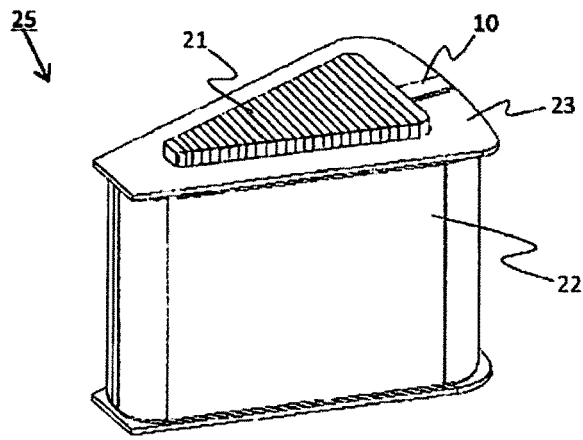
FIG. 2A is a perspective view illustrating a configuration of a stator core for one slot according to the first embodiment.
Figure 2B:
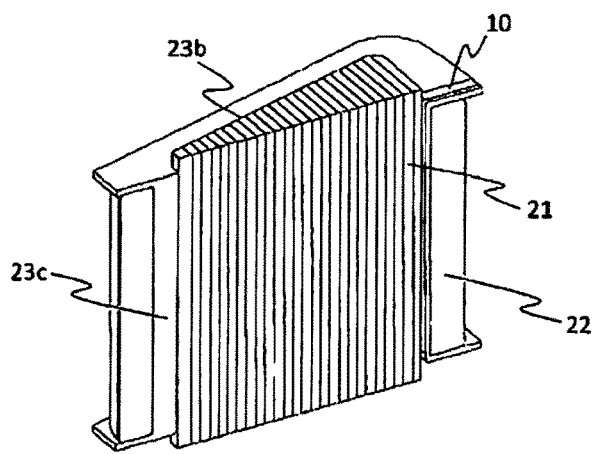
FIG. 2B is a sectional side view of FIG. 2A.
Figure 2C:
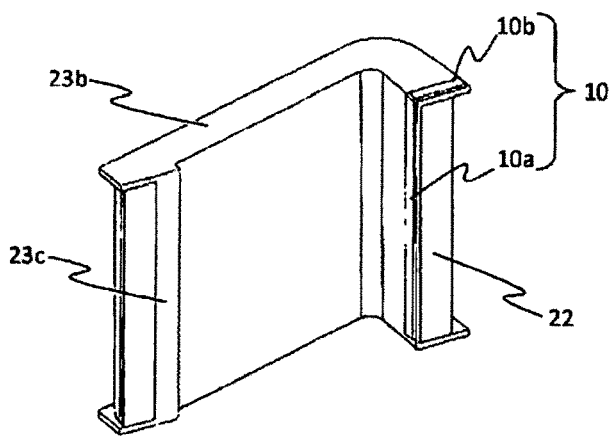
FIG. 2C is a sectional side view illustrating a part in which an iron core is removed from FIG. 2B.

The stator core 25 is described in detail. FIGS. 2A to 2C illustrate a configuration of the stator core 25. As illustrated in FIG. 2A, the stator core 25 includes an iron core 21, a bobbin 23, the coil 22, and a conductive member 10, the coil 22 being wound around the outer periphery of the bobbin 23 having the iron core 21 inserted thereinto to constitute the stator for one slot.

The iron core 21 is a laminated iron core formed by laminating steel plates or magnetic metals (which contain amorphous in the present embodiment, but the present invention is not limited thereto). The iron core 21 has a section having a column-like shape such as a substantially trapezoidal shape and a fan shape by laminating amorphous pieces cut such that the widths thereof sequentially increase from a radial direction of a rotating shaft toward an inner diameter side of the housing 50.

The bobbin 23 is made of insulation material (is made of resin in the present embodiment). The bobbin 23 has a tubular portion 23c having an inner diameter which is substantially equal to an outer diameter of the iron core 21. Flange portions 23b are provided to both ends of the tubular portion 23c, the flange portion extending from the tubular portion 23c to the outside in the vertical direction by a predetermined length. When the coil 22 is wound around the outer periphery of the tubular portion 23c, the end of the coil 22 is covered by the flange portion 23b. It can be also said the flange portion 23b is an end surface of the tubular portion 23c.

A conductive member 10 is arranged along a surface of the flange area 23b on the housing side (i.e., a surface opposite to a surface covering the coil 22) from an inner surface of the tubular portion 23c of the bobbin 23 on the housing side.

FIGS. 2B and 2C are sectional views illustrating the stator core 25 and the bobbin 23, respectively. The conductive member 10 is made of a conductive material such as aluminum, iron, or SUS, and is a thin plate-like member of which one part is bent at a right angle. The conductive member 10 includes a horizontal portion 10a located between the iron core 21 and an inner tubular portion of the tubular portion 23c, and a vertical portion 10b located on a surface of the flange portion 23b, so as to form an L shape. The horizontal portion a contacts an inner peripheral surface of the tubular portion 23c. The vertical portion 10b contacts the end surface (which is also the flange 23b) of the opening portion of the tubular portion 23, and has a function for engaging the conductive member 10. Note that a surface of the conductive member 10 which faces the bobbin is entirely or partially adhered by an adhesive or the like, but the present embodiment is not limited to this.

Figure 3:
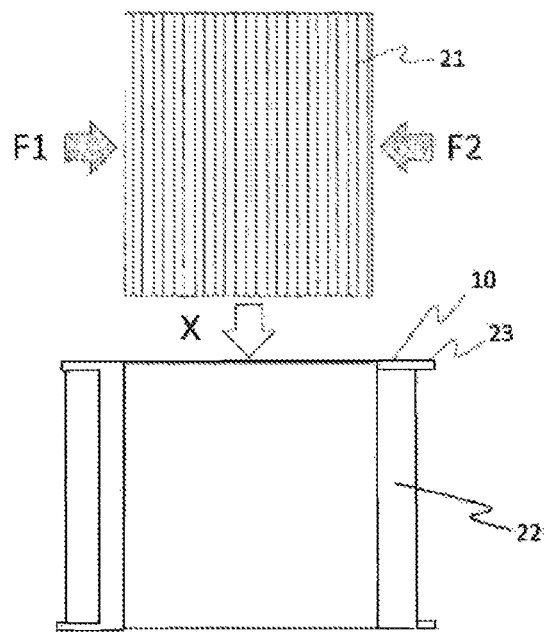
FIG. 3 is a side view illustrating a state where the iron core is inserted into a bobbin in the stator core according to the first embodiment.

FIG. 3 is sectional side views illustrating the iron core 21 and the bobbin 23, and schematically illustrates a state where the iron core 21 is inserted into the bobbin 23. The iron core 21 is inserted into the bobbin 23 on which the conductive member 10 is provided, while the iron core 21 is pressurized by forces F1 and F2 from a laminating direction. A gap between plates is reduced by inserting magnetic metal pieces in a sufficiently pressurized state, thereby increasing the density or improving a magnetic characteristic of the iron core 21. Note that in the present embodiment, the conductive member 10 is adapted to insert the iron core 21 in a state where the vertical portion 10b is sufficiently pressed by a mold of the machine.

When the iron core 21 is inserted into the tubular portion 23c, the horizontal portion 10a is in contact with the iron core 21, and is electrically connected. The vertical portion 10b is provided with conductive means for electrically connecting with the housing 50. Note that the conductive means is described later in detail.

Since the iron core 21 is inserted while a side surface on lower base sides of the substantially trapezoidal shaped sections of the iron core 21 contacts the conductive member 10, the side surface functions as a guide for insertion. Further, the core 21 inserted into the bobbin 23 is expanded in the laminating direction, and therefore, a surface pressure between the core 21 and the conductive member 10 is increased.

The effects of the double rotor type axial air gap rotating electric machine according to the first embodiment having the above configuration are described. In the present embodiment, since the vertical 10b is electrically connected with the housing 50, the iron core 21 becomes a ground potential, and therefore there is an effect of reducing the shaft voltage.

The horizontal portion 10a of the conductive member 10 is protruded from the bobbin tubular portion 23a toward the iron core 21 side by its thickness, and therefore the contact pressure between the iron core 21 and the conductive member 10 can be reliably secured. On the other hand, in the present embodiment, a plurality of stator cores 25 are integrally molded with a resin mold. However, the conductive member 10 is the thin plate-like member, and therefore there are effects of reducing the possibility of resin entering between the iron core 21 and the conductive member 10 and ensuring contact between the iron core 21 and the conductive member 10.

In the present embodiment, since the horizontal portion 10a of the conductive member 10 is protruded from the bobbin tubular portion 23a toward the core 21 side by its thickness, the contact area between the iron core 21 and the bobbin 23 is reduced. The iron core 21 is preferably provided in the tubular portion 23c of the bobbin 23 accurately and stably, from a view of performance and reliability. Since the iron core 21 is formed by laminating tapes containing magnetic metal, the iron core 21 may receive damage such as galling and buckling of the tape due to the friction when the iron core 21 is inserted. The presence of the conductive member 10 reduces the friction area between the tubular portion 23c and the iron core 21, thereby obtaining an effect of preventing the damage.

The vertical portion 10b side of the conductive member 10 is over the flange portion 23b so as to form an L shape, and therefore the iron core 21 can be smoothly inserted without opening (turning over) of the horizontal portion 10a of the first conductive member 10 toward the iron core 21 side.

According to the present embodiment, the electrocorrosion of the bearing can be surely prevented, and the accuracy of assembling of the stator core 25 can be increased.

Modification of First Embodiment

In the first embodiment, the conductive member 10 is formed by bending a rectangular conductor plate nearly at a right angle, but may have other shape as long as the conductive member 10 has the horizontal portion 10a and the vertical portion 10b.

Figure 4:
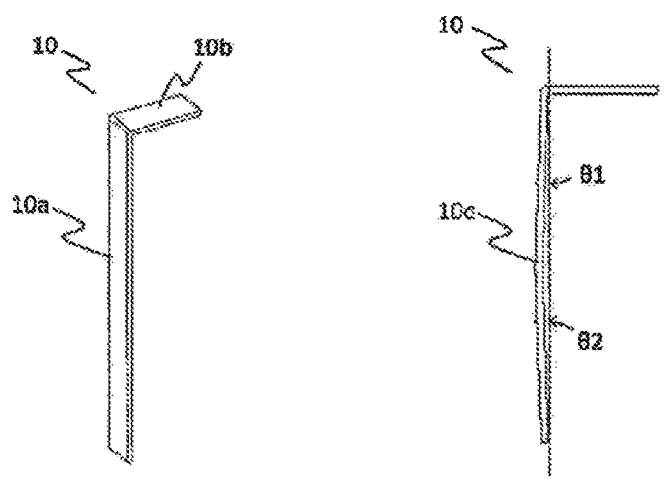
FIG. 4 is a perspective view illustrating a conductive member 10 according to a modification of the first embodiment.

FIG. 4 illustrates an example in which a bending angle between the horizontal portion 10a and the vertical portion 10b is 90 degrees or more, and a bending portion 10c is further provided to the horizontal portion 10a. In the figure, angles θ1 and θ2 are provided relative to a perpendicular from the vertical portion 10b. When a center part of the horizontal portion 10a is formed in such a shape, the conductive member 10 is plastically deformed along flat surfaces of the iron core 21 and the bobbin 23 when the iron core 21 is inserted. The conductive member 10 can apply larger contact pressure to the core 21.

The shapes of the horizontal surface and vertical surface of the conductive member 10 may not be rectangular formed by bending a plate having a constant width.

Figure 5A:
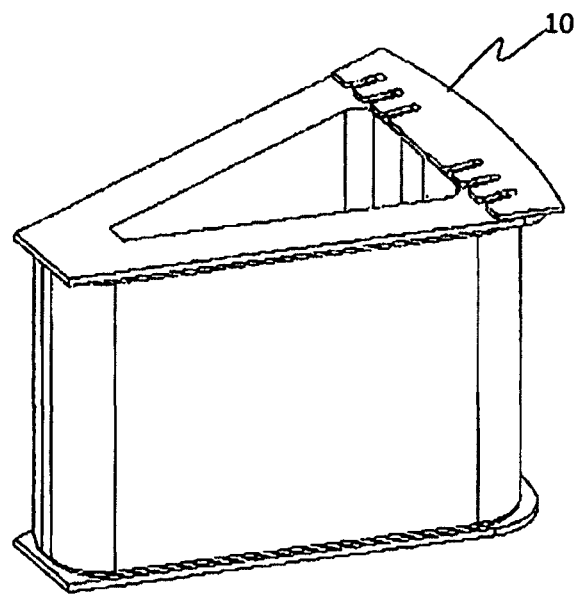
FIG. 5A is a perspective view illustrating a configuration of a stator core according to another modification of the first embodiment.
Figure 5B:
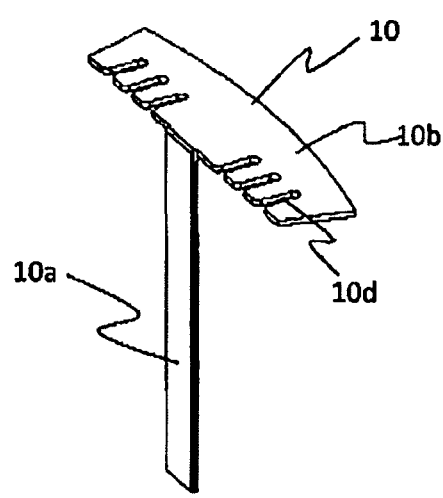
FIG. 5B is a perspective view illustrating a configuration of a conductive member 10 according to another modification of the first embodiment.

FIGS. 5A and 5B illustrate another modification of the conductive member 10. The conductive member 10 is configured to expand the shape of the vertical portion 10b according to the shape of the bobbin flange portion 23b. That is, the conductive member 10 is present on the surface of the flange portion 23b and has a plate-like shape covering a part between the iron core 21 and the housing 50. By thus increasing the contact area with the bobbin flange portion 23b, the conductive member 10 can be more stably held to the bobbin 23, thereby easily inserting the iron core 21. Furthermore, the vertical portion 10b can be easily pressed by a mold when the iron core 21 is inserted.

The vertical portion 10b is provided with a plurality of slits 10d. A purpose of this is to suppress a large eddy current from occurring in the vertical portion 10b whose area is increased. As a result, the horizontal portion 10a serves as a shielding material which reduces the electrostatic capacitance between the coil 22 and the rotor 30, and therefore it also contributes to reduction of the shaft voltage.

Second Embodiment

Figure 6A:
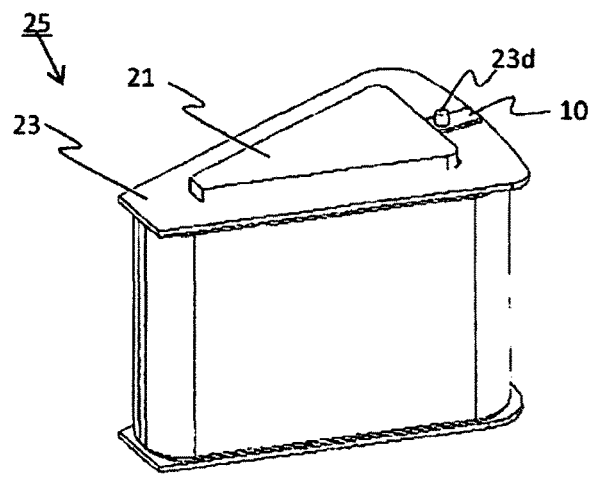
FIG. 6A is a perspective view illustrating a configuration of a stator core according to a second embodiment.
Figure 6B:
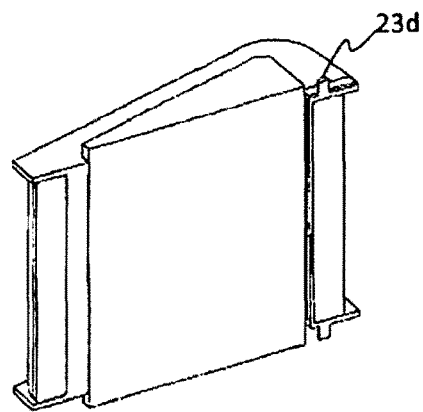
FIG. 6B is a sectional side view of FIG. 6A.

FIG. 6A is a perspective view illustrating an entire stator core 25 for one slot in a rotating electric machine 1 according to a second embodiment. FIG. 6B is a perspective sectional view of the stator core 25.

Figure 6C:
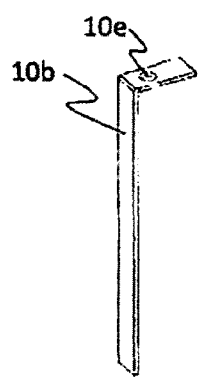
FIG. 6C is a perspective view illustrating a configuration of a conductive member 10 according to the second embodiment.

In the second embodiment, a vertical portion 10b of a conductive member 10 has a hole 10e, and a protrusion portion 23d which is passed through the hole 10e is further provided to a flange portion 23b of a bobbin 23 so as to protrude to a rotor 30 side from the vertical portion 10b (see FIG. 6C). That is, a purpose of this is to suspend the conductive member 10 on the bobbin 23 stably.

An inner diameter of the hole 10e is substantially the same size as an outer diameter of the protrusion portion 23d. Both of them do not necessarily have sizes enough to fit the protrusion portion 23d into the hole 10e, and may have sizes enough to engage the protrusion portion 23d with the hole 10e. If there is some margin, an effect that the conductive member 10 can be easily provided to the bobbin 23 can be expected. Note that the shapes of the hole 10e and the protrusion portion 23d are not limited to a circular shape, may be a rectangular solid or a polygonal shape.

According to the second embodiment, a positional relation between the conductive member 10 and the bobbin 23 is determined by the hole 10d and the protrusion portion 23e. Since the protrusion portion 23d is projected from the conductive member 10, the relative positional relation is never deviated as long as the positional relation is not reversed. That is, the conductive member 10 and the bobbin 23 are temporarily fixed to each other. Then, in an assembling step, the first conductive member 10 is suppressed from being separated from the bobbin 23, thereby facilitating handling. The conductive member 10 can be suppressed from moving when the iron core 21 is inserted.

Third Embodiment

Figure 7A:
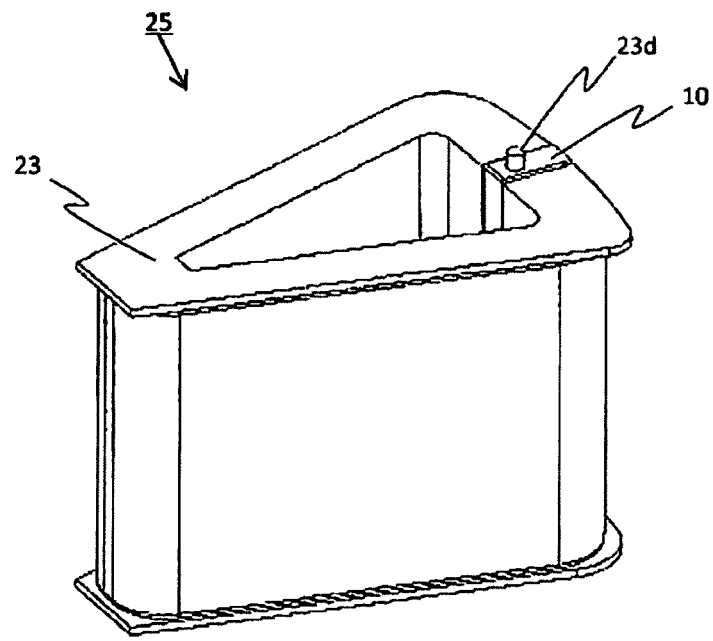
FIG. 7A is a perspective view illustrating a configuration of a stator core for one slot according to a third embodiment.
Figure 7B:
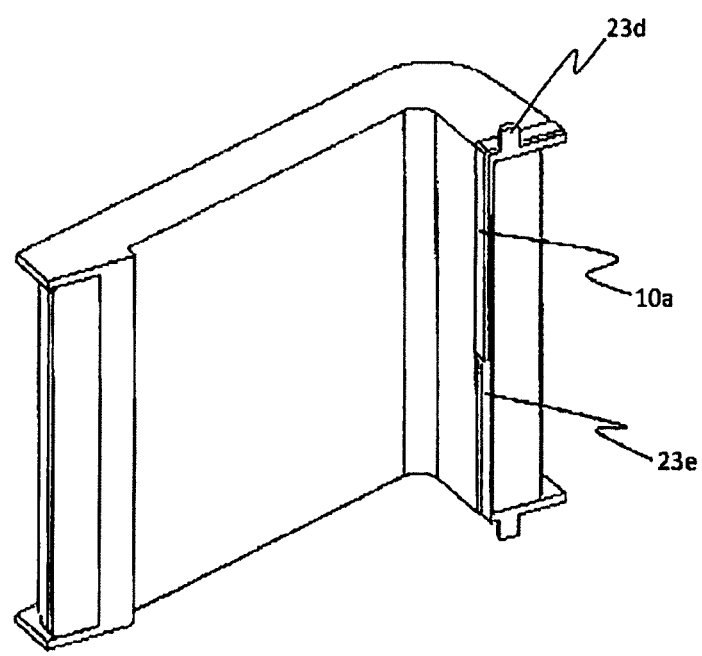
FIG. 7B is a sectional side view of FIG. 7A.

FIG. 7A is a perspective view illustrating an entire stator core 25 for one slot in a rotating electric machine 1 according to a third embodiment. FIG. 7B is a perspective sectional view of the stator core 25.

The stator core 25 of a fourth embodiment has a groove portion 23e which is provided over between both flange portions 23b on an inner diameter side of a tubular portion 23a of a bobbin 23, the inner diameter side facing a horizontal portion 10a of a conductive member 10 in a radial direction of a rotating shaft.

Figure 7C:
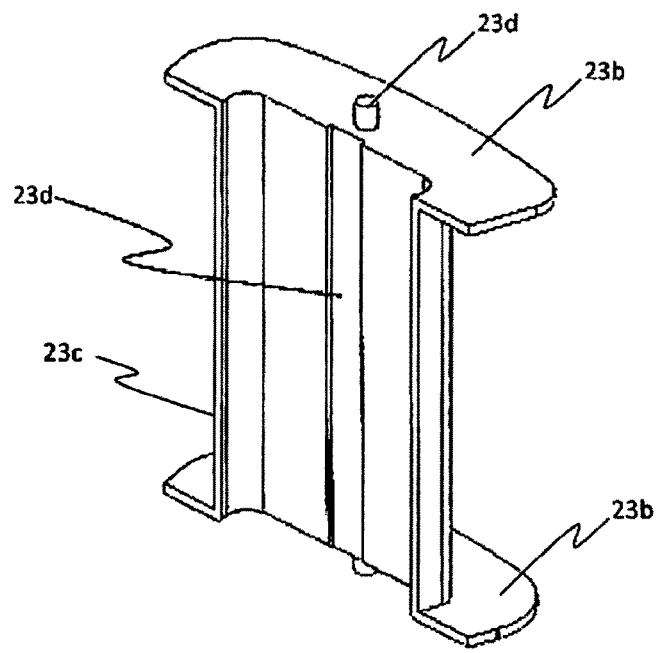
FIG. 7C is a sectional view illustrating a part of bobbin 23 of FIG. 7A on a housing portion side.

FIG. 7C is a partial sectional view of the bobbin 23 on a housing 50 side. The groove portion 23e has a width corresponding to a width of the horizontal portion 10a of the conductive member 10. The groove portion 23e is formed shallower than a thickness of the conductive member 10. That is, the conductive member 10 is provided to the bobbin 23 in a state where a vertical portion 10b is fitted into the groove portion 23d and is protruded from the groove portion 23d in a rotational axis direction by a thickness difference between the vertical portion 10b and the groove portion 23d. A purpose of this is to provide the conductive member 10 more stably. Note that the shape of the groove portion 23d is not limited to a rectangular solid, and may be a trapezoidal shape or other shape so as to match the shape of the horizontal portion 10a of the first conductive member 10. The depth of the groove portion 23d is not necessarily uniform, but can be suitably changed.

According to the third embodiment, the positional relation between the conductive member 10 and the bobbin 23 is more stably determined by the groove portion 23e. Then, the conductive member 10 can be surely suppressed from being deviated when the iron core 21 is inserted, thereby further improving the assemblability and the workability. Furthermore, the thickness of the horizontal portion 10a of the conductive member 10 and the projection amount from the flange portions 23b of the bobbin can be independently designed by adjusting the depth of the groove portion 23e. By applying necessary thickness to the conductive member 10 in view of strength and on the other hand minimizing the projection amount from the flange portions 23b, the conductive member 10 can be prevented from being deformed and broken due to the friction when the iron core 21 is inserted, and the outer diameter side of the iron core 21 which does not contact the conductive member 10 can be suppressed from being largely deformed after the iron core 21 is inserted.

The shape of the groove portion 23d provided to the bobbin 23 is not limited to a rectangular solid, and may be a trapezoidal shape or other shape so as to match the shape of the horizontal portion 10a of the first conductive member 10. The depth of the groove portion 23d is not necessarily uniform.

Fourth Embodiment

Figure 8:
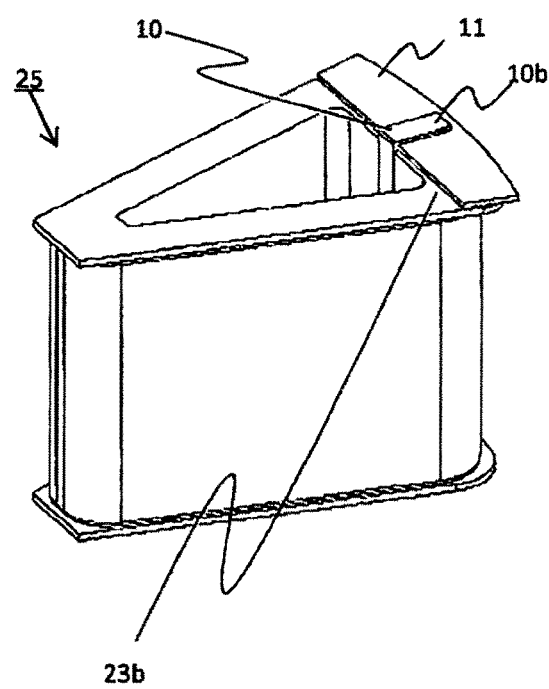
FIG. 8 is a perspective view illustrating a configuration of a stator core for one slot according to a fourth embodiment.

FIG. 8 is a perspective view illustrating an entire stator core 25 for one slot in a rotating electric machine 1 according to a fourth embodiment (an iron core 21 is not illustrated). In the present embodiment, in addition to an electric member 10, an electric member 11 which is electrically connected to a housing 50 is arranged on a flange portion 23b of the bobbin. The conductive member 10 is electrically and mechanically connected to the conductive member 11 by the vertical portion 10b.

According to the fourth embodiment, since the conductive member 10 contacts the flange portion 23b of the bobbin through the conductive member 11 at a larger area, the conductive member 10 can be stably held to the bobbin 23, thereby facilitating insertion of the iron core 21. An effect that the conductive member 11 can be easily pressed by a mold of the machine when the iron core 21 is inserted can be also expected. At the same time, the conductive member 11 serves as a shielding material which reduces the electrostatic capacitance between a coil 22 and a rotor 30, and therefore it also contributes to reduction of the shaft voltage. Furthermore, compared to the shape described in the modification of the first embodiment (FIGS. 5A and 5B), each of the conductive member 10 and the conductive member 11 can be manufactured in a simple shape, thereby enhancing a material yield. The material and thickness of each conductive member can be individually set, and therefore a proper design can be performed in view of functions and costs.

Fifth Embodiment

Figure 9A:
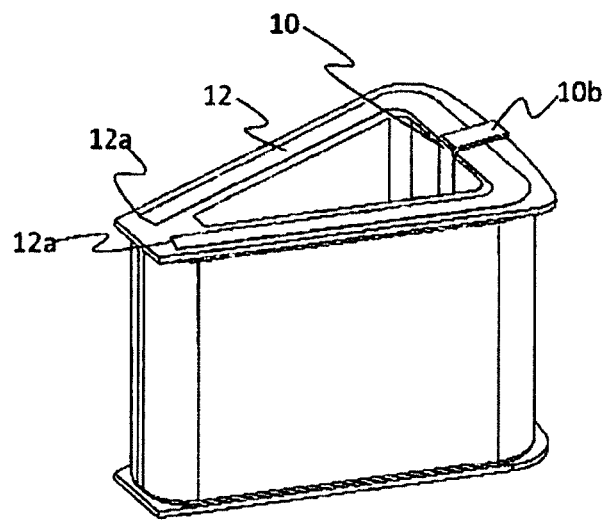
FIG. 9A is a perspective view illustrating a configuration of a stator core for one slot according to a fifth embodiment.

FIG. 9A is a perspective view illustrating an entire stator core 25 for one slot in a rotating electric machine 1 according to a fifth embodiment (an iron core 21 is not illustrated). In the stator core 25 in the rotating electric machine 1 according to the fifth embodiment, a conductive member 12 is arranged on both diagonal side parts and a lower base part of a substantially trapezoidal shaped flange portion 23 of a bobbin. That is, the conductive member 12 has a function of a shielding material which reduces the electrostatic capacitance between a coil 22 and a rotor 30.

The conductive member 12 is made of a conductive tape material and is adhered to the bobbin flange portion 23b. The conductive member 12 is 1 mm or less in thickness and is not provided on an upper base part of the flange portion 23 (discontinuous part 12a). A purpose of this is to suppress an eddy current and hardly generate the increase in the loss.

Furthermore, the conductive member 10 is adapted to be connected to the bobbin 23 through the conductive member 12 adhered to the flange portion 23b.

According to the fifth embodiment, the conductive member 10 does not come off the bobbin 23 when the iron core 21 is inserted, thereby improving the assemblability. The conductive member 12 serves as a shielding material which reduces the electrostatic capacitance between a coil 22 and a rotor 30, and therefore it also contributes to reduction of the shaft voltage. Furthermore, the conductive member 12 is 1 mm or less in thickness and has the discontinuous part 12a, and therefore there are effects of suppressing the eddy current and hardly generating the increase in the loss.

Modification of Fifth Embodiment

Figure 9B:
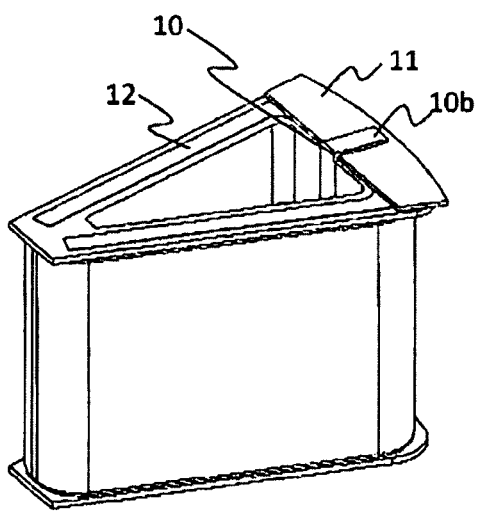
FIG. 9B is a perspective view illustrating a configuration of a stator core for one slot according to a modification of the fifth embodiment.

FIG. 9B is a perspective view illustrating an entire stator core 25 which is a modification of the fifth embodiment (an iron core 21 is not illustrated). In the present modification, a conductive member 11 is further provided.

The conductive member 11 is arranged on a conductive member 12 on a lower base side of the flange portion 23b. Furthermore, a vertical portion 10b of the conductive member 11 is arranged on the conductive member 11, and these are configured to be electrically and mechanically connected to each other.

According to the present modification, the conductive members 10 and 11 facilitate insertion of the iron core 21, thereby improving the assemblability. Furthermore, the conductive members 11 and 12 reduce the electrostatic capacitance between a coil 22 and a rotor 30, and there is an effect of reducing the shaft voltage.

Sixth Embodiment

Figure 10A:
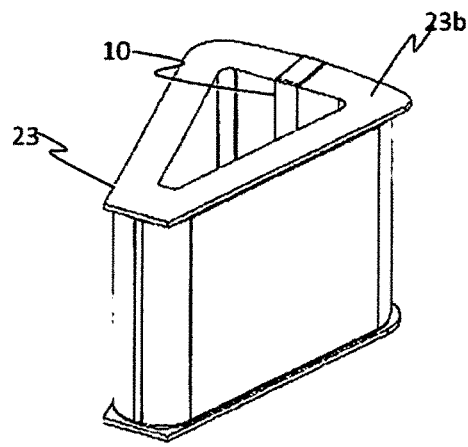
FIG. 10A is a perspective view illustrating a configuration of a stator core for one slot according to a sixth embodiment.
Figure 10B:
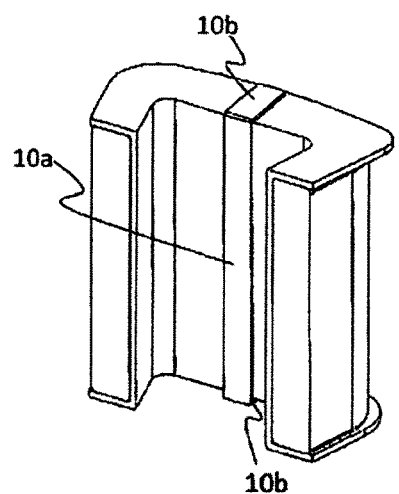
FIG. 10B is a sectional view illustrating a part of bobbin of FIG. 10A on a housing portion side.
Figure 10C:
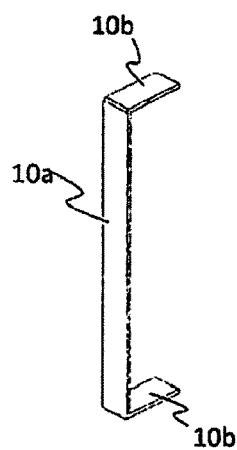
FIG. 10C is a perspective view illustrating a conductive member illustrated in FIG. 10A and FIG. 10B.

FIG. 10A is a perspective view illustrating an entire stator core 25 for one slot in a rotating electric machine 1 according to a sixth embodiment, and FIG. 10B is a partial sectional view of the stator core 25 on a housing 50 side only (in both figures, an iron core 21 is not illustrated). In the sixth embodiment, both end portions of a conductive member 10 are vertical portions 10b so as to form a U-shape (see FIG. 10C). The vertical portions 10b at both ends are adapted to sandwich both flange portions 23b.

According to the sixth embodiment, the conductive member 10 is arranged so as to sandwich the bobbin 23 by both vertical portions 10b, and therefore the conductive member 10 hardly comes off the bobbin 23, thereby improving the workability. In addition, the iron core 21 can be inserted from both sides of the bobbin 23, thereby improving the workability. Furthermore, since the vertical portions 10b are provided at both ends of the bobbin 23, the conductivity with the housing 50 can be ensured in any direction. The workability is improved and the degree of freedom in a machine configuration is improved.

Seventh Embodiment

Figure 11A:
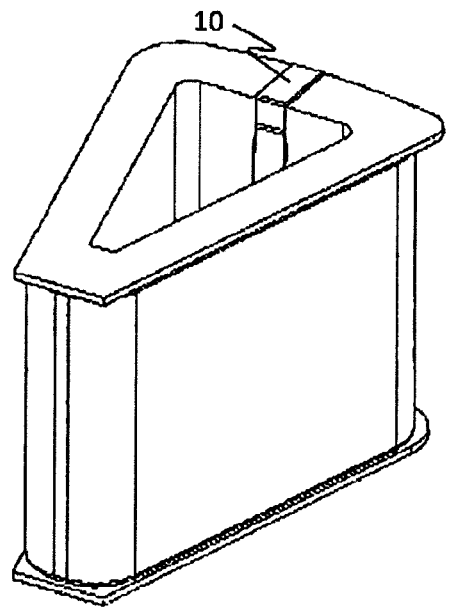
FIG. 11A is a perspective view illustrating a configuration of a stator core for one slot according to a seventh embodiment.
Figure 11B:
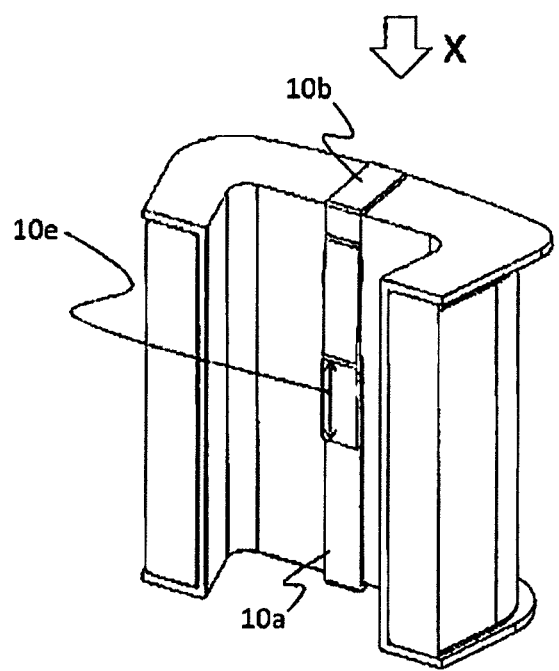
FIG. 11B is a sectional view illustrating a part of bobbin of FIG. 11A on a housing portion side.

FIG. 11A is a perspective view illustrating an entire stator core 25 for one slot in a rotating electric machine 1 according to a seventh embodiment, and FIG. 11B is a partial sectional view of the bobbin on a housing 50 side (an iron core 21 is not illustrated). In the seventh embodiment, the conductive members 10 are arranged by being inserted from both end portions of a tubular portion 23c, respectively, so that tips of horizontal portions 10a overlap one another in an inner diameter portion of the tubular portion 23c (overlapping 10e).

According to the seventh embodiment, since two conductive members 10 are conductive, they can be electrically connected to the housing 50 from any direction, thereby improving the workability and the degree of freedom in the configuration. Each conductive member 10 has an L-shape, and therefore the vertical portion 10b of the conductive member 10 can be stably mounted on a flange portion 23b irrespective of processing accuracy of a length of the horizontal portion 10a. Since the tips of the conductive members 10 overlap one another, the iron core 21 does not interfere with the facing horizontal portions 10a by inserting the iron core 21 from the vertical portion 10b side of the conductive member 10 located on the iron core 21 side.

Eighth Embodiment

A rotating electric machine 1 of an eighth embodiment is described with reference to FIGS. 12A to 12E. In the rotating electric machine 1 of the eighth embodiment, a vertical portion 10b of a conductive member 10 and a conductive member 11 are fastened with a fastening member 13a such as a bolt or a rivet, and both end portions of the conductive member 11 in a rotating direction of a rotating shaft have a fastening member 13b for connecting to the conductive member 11 of the adjacent stator core 25.

Figure 12A:
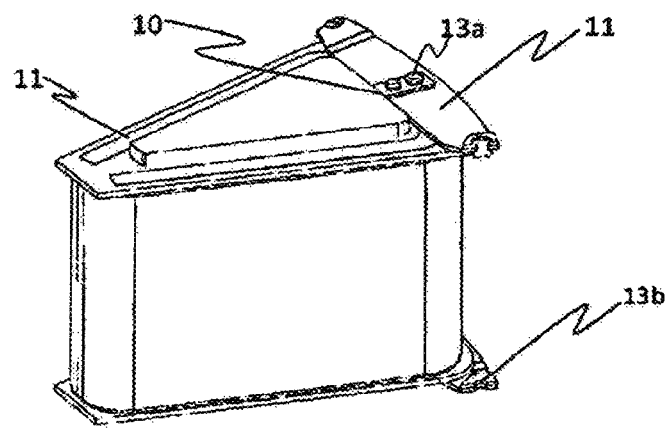
FIG. 12A is a perspective view illustrating a configuration of a stator core for one slot according to an eighth embodiment.
Figure 12B:
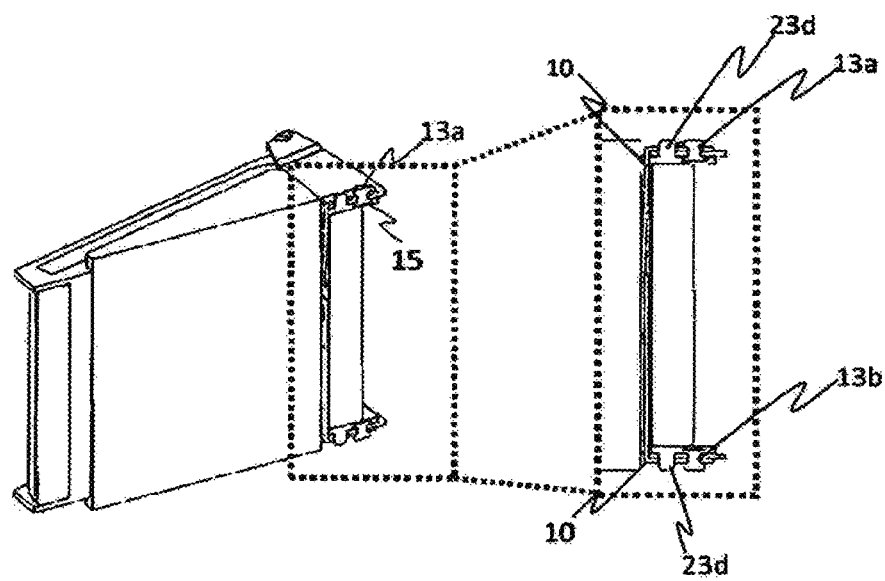
FIG. 12B is a sectional side view of FIG. 12A.
Figure 12C:
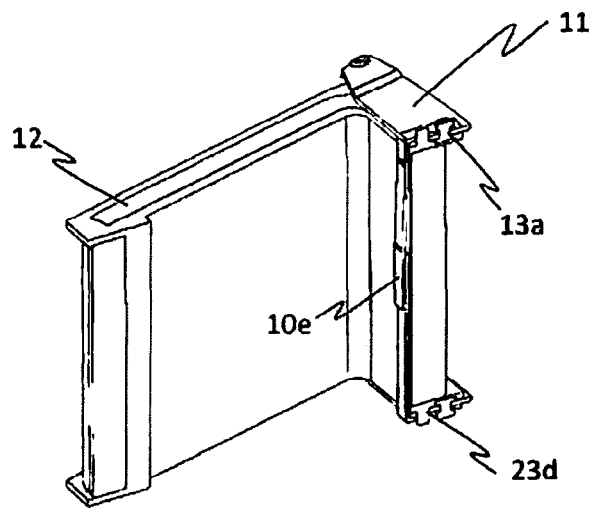
FIG. 12C is a sectional side view of FIG. 12B.

FIG. 12A is a perspective view illustrating an entire stator core 25, and FIG. 12B is a perspective sectional view of the stator core 25. FIG. 12C is a perspective sectional view illustrating the stator core 25 in which an iron core 21 is removed. Tape-like conductive members 13 are stuck on both diagonal side parts of a flange portion 23. The conductive member 11 is fastened to the vertical portion 10b of the conductive member 10 by a fastening member 13a, and is arranged to cover the conductive members 13 at a lower base part of the flange portion 23. As in the seventh embodiment, the conductive members 10 are inserted from both end portions of a tubular portion 23c, respectively, so that tips of horizontal portions 10a overlap one another at centers of the horizontal portions 10a (FIG. 12B, FIG. 12C). Then, the conductive members 10, 11 and 13 are electrically and mechanically connected to one another.

Figure 12D:
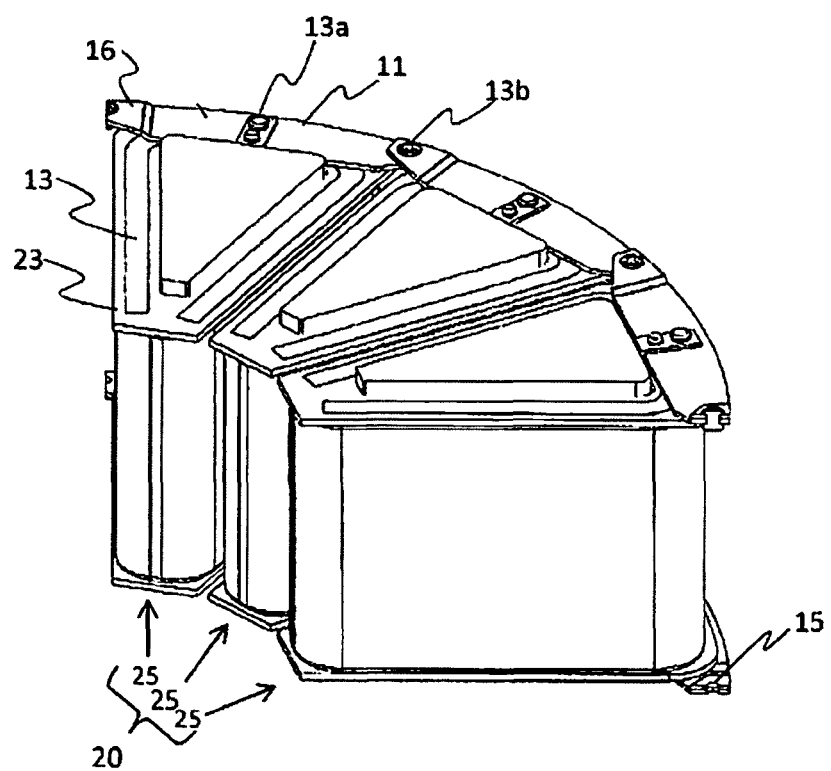
FIG. 12D is a perspective view illustrating a state where the stator cores of the eighth embodiment are partially arranged in a ring shape.

As illustrated in FIG. 12D, the conductive member 12 has at least one fastening hole 15 at both end portions thereof in the rotating direction of the rotating shaft, the fastening hole being provided for fastening adjacent stator cores 25 by the fastening member 13b when the stator cores 25 are arranged in a ring shape. As the fastening member 13b, a bolt or a rivet shall be used. One of both ends having the fastening hole 15 of the conductive member 12 is higher than the other of both ends thereof by the thickness of the conductive member 12 (step part 16). A purpose of this is to connect the adjacent stator cores 25 to each other by overlapping the fastening hole 15 in the step part 16 on the fastening hole 15 in the other lower end of the conductive member 12, to provide a level of a circular ring-shaped stator 20. Note that the conductive members 11 fastened by the fastening member 13b are electrically connected to each other.

Figure 12E:
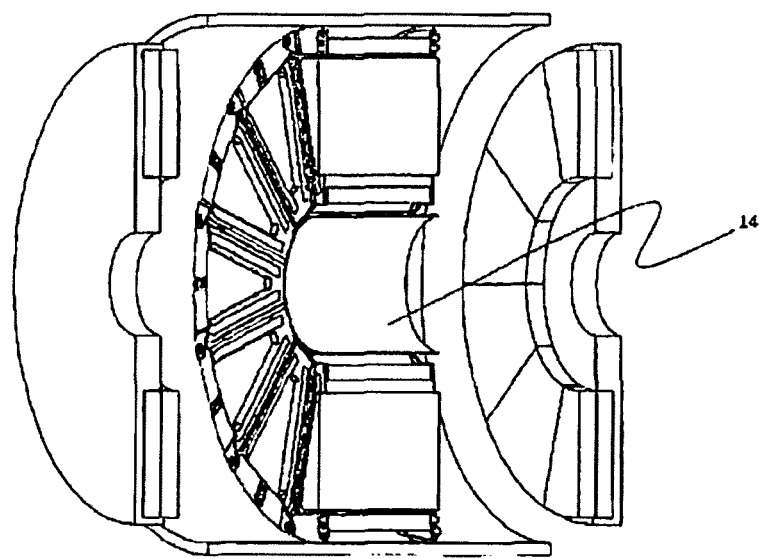
FIG. 12E is a perspective view illustrating a position of a conductive member 14 of a rotating electric machine of the eighth embodiment.

FIG. 12E is a sectional view illustrating main parts of the rotating electric machine 1. A tubular conductive member 14 made of a conductive member is arranged between a shaft 40 and a center part in the shaft direction of the stator 20 integrally fixed by a resin mold in a circular ring shape. The conductive member 14 is connected to the center part of the stator 20, and a predetermined clearance is provided between the conductive member 14 and the shaft 40. An outer periphery of the conductive member 14 (opposite side to the stator 20) and the conductive member 11 are connected to each other through a lead wire (not illustrated). That is, a purpose of this is to reduce electrostatic capacitance between the coil 22 and the shaft 40.

According to the eighth embodiment, the conductive members 10 and 11 are firmly fixed by the fastening member 13a, thereby improving the workability in inserting the iron core 21. Furthermore, the electric conductive reliability is also improved.

In the stator core 25, the conductive members 11 arranged on both flange portions 23b are electrically connected to each other, the conductive connection with the housing 50 can be performed at any one place. Therefore, the structure is simplified and the degree of freedom is increased.

The mechanical fastening of the conductive members 11 of the adjacent stator cores 25 contributes to the positioning of the stator cores 25.

The conductive member 14 arranged at the center of the stator 20 is electrically connected to the conductive member 11, and thereby the conductive member 14 is also electrically connected to the housing 50. As a result, the electrostatic capacitance between the coil 22 and the shaft 40 can be reduced and the shaft voltage can be suppressed.

It is possible to improve the assembling accuracy by using a rivet utilizing a plastic deformation for the fastening members 13a and 13b. That is, the rivet is plastically deformed so that a core of the rivet is expanded relative to a calking hole provided in the conductive member. Therefore, the center accuracy of calking holes is improved. Particularly, when the conductive members 11 are fastened, the workability and the degree of freedom in design can be greatly improved by using a blind rivet to enable fastening by drawing from one side.

Although the embodiments to carry out the present invention have been described above, the present invention is not limited to various embodiments described above, and various configurations can be applied without departing from the scope of the invention.

Although the illustrative double rotor type axial air gap rotating electric machine has been described in the present embodiments, for example, the present embodiments can be applied to a single rotor type. Although the laminated iron core is used as the iron core 21, even when a power iron core or a laminated iron core formed by laminating in the shaft direction is used, there are effects of reducing the shaft voltage and of facilitating insertion of the iron core. Although the configuration in which the stator 20 is resin-molded is used, a configuration in which the stator 20 is fixed by ring members suspended on various places thereof may be used.

REFERENCE SIGNS LIST 1 double rotor type axial air gap rotating electric machine
10 conductive member
10a horizontal member
10b vertical portion
10c bending portion
10d slit
10e hole
11 conductive member
12 conductive member
12a discontinuous part
13a fastening member
13b fastening member
14 conductive member
20 stator
21 iron core
22 coil
23 bobbin
23b flange portion
23c tubular portion
23d protrusion portion
23e groove portion
25 stator core
30 rotor
31 permanent magnet
32 back yoke
33 yoke
40 shaft
50 housing
60 end bracket
70 bearing

The invention claimed is:

1. An axial air gap rotating electric machine comprising:
a circular ring-shaped stator formed by a plurality of stator cores arranged about a rotational axis direction in a ring shape, the stator cores each comprising an iron core, a tubular bobbin and a coil, the iron core having a columnar body whose side surface has a substantially trapezoidal shape, the tubular bobbin having the iron core inserted into a bobbin inner tubular portion substantially matching an outer peripheral shape of the iron core, the coil being wound around an outer tubular portion of the bobbin;
at least one rotor plane-opposing to the side surface with a predetermined air gap interposed therebetween in a radial direction of a rotating shaft;
a substantially tubular shaped housing having an inner circumferential surface which supports the stator;
a bracket which rotatably supports the rotating shaft connected with the housing and with the rotor through a bearing; and
a plate-like first conductive member having a horizontal portion extending from one opening portion of the bobbin inner tubular portion on an inner peripheral surface of the bobbin inner tubular portion in parallel with the rotating shaft and a vertical portion bent in a direction perpendicular to an extending direction of the horizontal portion and contacting an end surface of the opening portion, wherein the horizontal portion contacts a part of an outer peripheral surface of the iron core and a part of the inner peripheral surface of the bobbin inner tubular portion, and the vertical portion is conductively connected to an inner circumferential surface of the housing.

2. The axial air gap rotating electric machine according to claim 1, wherein
an end surface of the opening is present on a side facing the rotor.

3. The axial air gap rotating electric machine according to claim 1, wherein
the horizontal portion contacts a part of the outer peripheral surface of the iron core on the housing side and a part of the inner peripheral surface of the bobbin inner tubular portion.

4. The axial air gap rotating electric machine according to claim 1, wherein
the horizontal portion is bent in a vicinity of a center thereof in the extending direction toward the iron core side.

5. The axial air gap rotating electric machine according to claim 1, wherein
the end surface of the opening portion of the bobbin has a protrusion portion, and
the vertical portion has a hole for inserting the protrusion portion.

6. The axial air gap rotating electric machine according to claim 1, wherein
a part of the inner peripheral surface of the bobbin inner tubular portion which the horizontal portion contacts has a groove portion having a length equal to or more than a length of the horizontal portion and a thickness less than that of the conductive member.

7. The axial air gap rotating electric machine according to claim 1, wherein
the bobbin has a flange portion provided around the opening portion and extending in the direction perpendicular to the outer tubular portion by a predetermined length,
a plate-like second conductive member is further provided, the second conductive member being present on a surface of the flange portion which faces the rotor, and being arranged in a part between the iron core and the housing, and
the vertical portion contacts the end surface of the opening portion through the second conductive member.

8. The axial air gap rotating electric machine according to claim 1, wherein
the bobbin has a flange portion provided around the opening portion and extending in the direction perpendicular to the outer tubular portion by a predetermined length,
a plate-like third conductive member is further provided, the third conductive member being present on a surface of the flange portion which faces the rotor, and a part of the third conductive member being discontinuous, and
the vertical portion is engaged with the end portion of the opening portion through the third conductive member.

9. The axial air gap rotating electric machine according to claim 1, further comprising
a plate-like second conductive member which is present on a surface of the flange portion which faces the rotor, and is arranged in a part between the iron core and the housing,
wherein the vertical portion contacts the end portion of the opening portion through the second conductive member and the third conductive member.

10. The axial air gap rotating electric machine according to claim 1, wherein
the horizontal portion is extended to another opening portion of the bobbin inner tubular portion, and
another vertical portion is further provided, the other vertical portion being bent in a direction perpendicular to the extending direction of the horizontal portion and contacting the end surface of the other opening portion.

11. The axial air gap rotating electric machine according to claim 1, further comprising
another conductive member which has the vertical portion and the horizontal portion extending from another opening of the bobbin inner tubular portion,
wherein both tips of the horizontal portions overlap one another in the bobbin inner tubular portion.

12. The axial air gap rotating electric machine according to claim 1, wherein
the bobbin has a flange portion provided around the opening portion and extending in the direction perpendicular to the outer tubular portion by a predetermined length,
a plate-like second conductive member is further provided, the second conductive member being present on a surface of the flange portion which faces the rotor, and being arranged in a part between the iron core and the housing, and
the second conductive member has fastening means on both end portions thereof in a rotating direction of the rotating shaft, the fastening means being provided for connecting to one end portion of the second conductive member of an adjacent stator core in the rotating direction of the rotating shaft.

13. The axial air gap rotating electric machine according to claim 1, comprising
a tubular fourth conductive member which is provided between the rotating shaft and the stator, wherein
the fourth conductive member is conductively connected to an inner circumferential surface of the housing through the first conductive member.

14. The axial air gap rotating electric machine according to claim 1, wherein
the iron core is formed by laminating magnetic metal plates in the radial direction of the rotating shaft.

* * * * *